(12) United States Patent
Iyer et al.

(10) Patent No.: US 11,159,645 B2
(45) Date of Patent: Oct. 26, 2021

(54) ADAPTIVE BACKCHANNEL SYNCHRONIZATION FOR VIRTUAL, AUGMENTED, OR MIXED REALITY (XR) APPLICATIONS IN EDGE CLOUD ARCHITECTURES

(71) Applicant: Dell Products, L.P., Round Rock, TX (US)

(72) Inventors: Vivek Viswanathan Iyer, Austin, TX (US); Michael S. Gatson, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 139 days.

(21) Appl. No.: 16/449,258

(22) Filed: Jun. 21, 2019

(65) Prior Publication Data

US 2020/0404078 A1    Dec. 24, 2020

(51) Int. Cl.
*G06F 15/16* (2006.01)
*H04L 29/06* (2006.01)
(Continued)

(52) U.S. Cl.
CPC .............. *H04L 67/38* (2013.01); *G06F 3/012* (2013.01); *G06F 3/013* (2013.01); *H04L 47/32* (2013.01);
(Continued)

(58) Field of Classification Search
CPC ......... H04L 67/38; H04L 47/32; G06F 3/012; G06F 3/013; H04W 4/021; H04W 4/027; H04W 56/001
(Continued)

(56) References Cited

U.S. PATENT DOCUMENTS 10,475,415 B1 *  11/2019  Gatson .................... G06F 3/012
10,852,828 B1 *  12/2020  Gatson ................ G06K 9/4671
(Continued)

OTHER PUBLICATIONS

Riisgaard, et al., "SLAM for Dummies," A Tutorial Approach to Simultaneous Localization and Mapping, 127 pages, retrieved Aug. 22, 2018, available at https://ocw.mit.edu/courses/aeronautics-and-astronautics/16-412j-cognitive-robotics-spring-2005/projects/1aslam_blas_repo.pdf.

(Continued)

*Primary Examiner* — Thu Ha T Nguyen
(74) *Attorney, Agent, or Firm* — Fogarty LLP

(57) ABSTRACT

Embodiments of systems and methods for adaptive backchannel synchronization for virtual, augmented, or mixed reality (xR) applications in edge cloud architectures are described. In some embodiments, an Information Handling System (IHS) may include a memory having program instructions stored thereon that, upon execution by a processor, cause the IHS to: receive, from a first Head-Mounted Device (HMD), first Simultaneous Localization and Mapping (SLAM) data comprising a first plurality of packets; receive, from the HMD, an indication of a synchronized time; and at least one of: in response to a determination that the first SLAM data is advanced with respect to the synchronized time by a threshold value, drop one or more of the first plurality of packets; or in response to a determination that the first SLAM data is lagged with respect to the synchronized time by the threshold value, transform lagged SLAM data into current SLAM data.

20 Claims, 10 Drawing Sheets

(51) Int. Cl.
| | |
|---|---|
| *H04W 4/021* | (2018.01) |
| *G06F 3/01* | (2006.01) |
| *H04L 12/823* | (2013.01) |
| *H04W 56/00* | (2009.01) |
| *H04W 4/02* | (2018.01) |

(52) U.S. Cl.
CPC .......... *H04W 4/021* (2013.01); *H04W 4/027* (2013.01); *H04W 56/001* (2013.01)

(58) Field of Classification Search
USPC ................................................ 709/248, 200
See application file for complete search history.

(56) References Cited

U.S. PATENT DOCUMENTS

| | | | |
|---|---|---|---|
| 10,917,352 B1* | 2/2021 | Hanes ................... | H04L 47/323 |
| 11,069,082 B1* | 7/2021 | Ebrahimi Afrouzi ... | G01S 17/48 |
| 2012/0188148 A1* | 7/2012 | DeJong ................ | G02B 27/017 345/8 |
| 2013/0316675 A1* | 11/2013 | Luna ................... | H04L 12/1478 455/408 |
| 2014/0278229 A1* | 9/2014 | Hong ..................... | A61B 5/486 702/160 |
| 2015/0312719 A1* | 10/2015 | Cho ..................... | G01S 5/0263 455/456.5 |
| 2016/0026253 A1* | 1/2016 | Bradski ................ | H04N 13/344 345/8 |
| 2016/0066154 A1* | 3/2016 | Shin ..................... | H04W 4/021 455/456.1 |
| 2017/0041751 A1* | 2/2017 | Hong ................... | H04W 64/006 |
| 2017/0164300 A1* | 6/2017 | Lee ..................... | H04B 1/3838 |
| 2017/0186230 A1* | 6/2017 | Ivers ..................... | G06F 3/011 |
| 2018/0227706 A1* | 8/2018 | Cho ................... | A63B 24/0062 |
| 2019/0043259 A1* | 2/2019 | Wang ................... | G06F 3/04815 |
| 2019/0094981 A1* | 3/2019 | Bradski ................... | G06F 3/011 |
| 2019/0155386 A1* | 5/2019 | Tadi ................... | G06K 9/00536 |
| 2020/0042263 A1* | 2/2020 | Iyer ........................ | G06F 3/147 |
| 2020/0089321 A1* | 3/2020 | Kacelenga .............. | G06F 3/011 |
| 2020/0177870 A1* | 6/2020 | Tadi ................... | G02B 27/0172 |
| 2020/0267084 A1* | 8/2020 | Hande ..................... | H04L 47/32 |
| 2020/0372673 A1* | 11/2020 | Iyer et al. | |
| 2020/0404078 A1* | 12/2020 | Iyer ........................ | G06F 3/011 |
| 2021/0089040 A1* | 3/2021 | Ebrahimi Afrouzi ....................... A47L 9/2894 | |
| 2021/0126972 A1* | 4/2021 | Lobner ............... | H04L 65/1069 |
| 2021/0248514 A1* | 8/2021 | Celia ..................... | G06N 20/00 |

OTHER PUBLICATIONS

Joan Sola, "Simulataneous localization and mapping with the extended Kalman filter," Oct. 5, 2014, 35 pages, available at http://www.iri.upc.edu/people/jsola/JoanSola/objectes/curs_SLAM/SLAM2D/SLAM%20course.pdf.

Zia, et al., "Comparative Design Space Exploration of Dense and Semi-Dense SLAM," Mar. 3, 2016, 9 pages, available at https://arxiv.org/pdf/1509.04648.pdf.

Tang, et al., "Embedded Systems Architecture for SLAM Applications," 4 pages, publisher IEEE, retrieved Aug. 22, 2018, available at https://arxiv.org/ftp/arxiv/papers/1702/1702.01295.pdf.

Occipital, "Structure Core—High-performance depth sensing for any device," 6 pages, retrieved Oct. 31, 2018, available at http://www.occipital.com (structuredcoremodule).

Egodagamage, et al., "Distributed Monocular SLAM for Indoor Map Building," Journal of Sensors, vol. 2017, Article ID 6842173, 2017, 6 pages, retrieved Aug. 22, 2018, available at https://www.hindawi.com/journals/is/2017/6842173/.

Nettleton, et al., "Decentralised SLAM with Low-Bandwidth Communication for Teams of Vehicles," Jul. 7, 2006, pp. 179-188, Publisher, Springer, Berlin, Heidelberg, retrieved Aug. 22, 2018, available at https://link.springer.com/chapter/10.1007%2F10991459_18#citeas.

Robert Collins, "Lecture 12: Camera Projection," Reading: T&V Section 2.4, CSE486, Penn State, 34 pages, retrieved Nov. 20, 2018, available at http://www.cse.psu.edu/~rtc12/CSE486/lecture12.pdf.

Researchgate, "Infrared marker-based tracking in an indoor unknown environment for augmented reality applications," in Proceedings of SPIE—The International Society for Optical Engineering 7513, DOI: 10.1117/12.839662, Nov. 2009, 10 pages, retrieved Mar. 6, 2019, available at https://www.researchgate.net/publication/252410108_Infrared_marker-based_tracking_in_an_indoor_unknown_environment_for_augmented_reality_applications.

Boyapalle, et al., U.S. Appl. No. 16/105,083, "Colloboration Between Head-Mounted Devices (HMDs) In Co-Located Virtual, Augmented, and Mixed Reality (xR) Applications," filed Aug. 20, 2018.

Iyer, et al., U.S. Appl. No. 16/105,128, "Head-Mounted Devices (HMDs) Discovery in Co-Located Virtual, Augmented, and Mixed Reality (xR) Applications," filed Aug. 20, 2018.

Iyer, et al., U.S. Appl. No. 16/113,007, "Context-Aware Hazard Detection Using World-Facing Cameras in Virtual, Augmented, and Mixed Reality (xR) Applications," filed Aug. 27, 2018.

Iyer, et al., U.S. Appl. No. 16/197,064, "Distributed Simultaneous Localization and Mapping (SLAM) in Virtual, Augmented, and Mixed Reality (xR) Applications," filed Nov. 20, 2018.

* cited by examiner

ADAPTIVE BACKCHANNEL SYNCHRONIZATION FOR VIRTUAL, AUGMENTED, OR MIXED REALITY (xR) APPLICATIONS IN EDGE CLOUD ARCHITECTURES

FIELD

The present disclosure generally relates to Information Handling Systems (IHSs), and, more particularly, to systems and methods for adaptive backchannel synchronization for virtual, augmented, or mixed reality (xR) applications in edge cloud architectures.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be used to produce virtual, augmented, or mixed reality (xR) applications. The goal of virtual reality (VR) is to immerse users in virtual environments. A conventional VR device obscures a user's real-world surroundings, such that only digitally-generated images remain visible. In contrast, augmented reality (AR) and mixed reality (MR) operate by overlaying digitally-generated content or entities (e.g., characters, text, hyperlinks, images, graphics, etc.) upon the user's real-world, physical surroundings. A typical AR/MR device includes a projection-based optical system that displays content on a translucent or transparent surface of an HMD, heads-up display (HUD), eyeglasses, or the like (collectively "HMDs").

In various implementations, HMDs may be tethered to an external or host IHS. Most HMDs do not have as much processing capability as the host IHS, so the host IHS is used to generate the digital images to be displayed by the HMD. The HMD transmits information to the host IHS regarding the state of the user, which in turn enables the host IHS to determine which image or frame to show to the user next, and from which perspective, as the user moves in space.

SUMMARY

Embodiments of systems and methods for adaptive backchannel synchronization for virtual, augmented, or mixed reality (xR) applications in edge cloud architectures are described. In an illustrative, non-limiting embodiment, an Information Handling System (IHS) may include: a processor; and a memory coupled to the processor, the memory having program instructions stored thereon that, upon execution, cause the IHS to: receive, from a first Head-Mounted Device (HMD), first Simultaneous Localization and Mapping (SLAM) data comprising a first plurality of packets; receive, from the first HMD, an indication of a synchronized time; and at least one of: in response to a determination that the first SLAM data is advanced with respect to the synchronized time by at least a threshold value, drop one or more of the first plurality of packets; or in response to a determination that the first SLAM data is lagged with respect to the synchronized time by at least the threshold value, transform lagged SLAM data into current SLAM data.

For example, the indication of the synchronized time may include a SLAM frame rate and a seed value. The first SLAM data may include a plurality of packets, and each of the plurality of packets may include at least one SLAM landmark and a timestamp. In some cases, each of the first plurality of packets may include pose information. To transform the lagged SLAM data into the current SLAM data, the program instructions, upon execution, may cause the IHS to apply a camera transform matrix to the lagged SLAM data using pose information obtained from an earlier SLAM packet.

The program instructions, upon execution, may further cause the IHS to select the threshold value as: a first value in response to the IHS being a co-located IHS, a second value greater than the first value in response to the IHS being an edge server, or a third value greater than the second value in response to the IHS being a cloud server. The threshold value may be selected based upon a latency parameter associated with the IHS. For example, the threshold value may be selected based upon a speed of movement of the first HMD.

The program instructions, upon execution, may further cause the IHS to: receive, from the first HMD, World-Facing Camera (WFC) or Gesture Recognition and Tracking (GRT) data comprising a second plurality of packets; and at least one of: in response to a determination that the WFC or GRT data is advanced with respect to the synchronized time by at least the threshold value, drop one or more of the second plurality packets; or in response to a determination that the WFC or GRT data is lagged with respect to the synchronized time by at least the threshold value, transform lagged WFC or GRT data into current WFC or GRT data using temporal interpolation.

The program instructions, upon execution, may further cause the IHS to: receive, from the first HMD, Eye-Gaze Tracking (EGT) data comprising a second plurality of packets; and at least one of: in response to a determination that the EGT data is advanced with respect to the synchronized time by at least the threshold value, drop one or more of the second plurality packets; or in response to a determination that the EGT data is lagged with respect to the synchronized time by at least the threshold value, transform lagged EGT data into current EGT data using linear interpolation.

The program instructions, upon execution, may further cause the IHS to: receive, from the first HMD, audio data; and at least one of: in response to a determination that the audio data is advanced with respect to the synchronized time by at least the threshold value, transform lagged audio data into current audio data using time scale modulation downsampling; or in response to a determination that the audio data is lagged with respect to the synchronized time by at least the threshold value, transform lagged audio data into current audio data using time scale modulation upsampling.

The program instructions, upon execution, may further cause the IHS to: receive, from a second HMD co-located with the first HMD, second SLAM data comprising a second plurality of packets; and at least one of: in response to a determination that the second SLAM data is advanced with respect to the synchronized time by at least a second threshold value, where the second threshold value is larger than the first threshold value, drop one or more of the second plurality of packets; or in response to a determination that the second SLAM data is lagged with respect to the other synchronized time by at least the second threshold value, transform lagged SLAM data into current SLAM data.

In another illustrative, non-limiting embodiment, a hardware memory may have program instructions stored thereon that, upon execution by an IHS, cause the IHS to: receive SLAM data comprising a first plurality of packets; select a first threshold value in response to the IHS being a local server, a second threshold value greater than the first threshold value in response to the IHS being an edge server, or a third threshold value greater than the second threshold value in response to the IHS being a cloud server; and at least one of: in response to a determination that the SLAM data is advanced by the selected threshold value or more, drop one or more of the first plurality of packets; or in response to a determination that the SLAM data is lagged by the selected threshold value or more, transform lagged SLAM data into current SLAM data.

The program instructions, upon execution, may cause the IHS to: receive WFC or GRT data comprising a second plurality of packets; and at least one of: in response to a determination that the WFC or GRT data is advanced with respect to the synchronized time by the threshold value or more, drop one or more of the second plurality packets; or in response to a determination that the WFC or GRT data is lagged with respect to the synchronized time by the threshold value or more, transform lagged WFC or GRT data into current WFC or GRT data.

The program instructions, upon execution, may further cause the IHS to: receive EGT data comprising a second plurality of packets; and at least one of: in response to a determination that the EGT data is advanced with respect to the synchronized time by the threshold value or more, drop one or more of the second plurality packets; or in response to a determination that the EGT data is lagged with respect to the synchronized time by the threshold value or more, transform lagged EGT data into current EGT data.

The program instructions, upon execution, may further cause the IHS to: receive audio data; and in response to a determination that the audio data is advanced or lagged with respect to the synchronized time by the threshold value or more, transform lagged audio data into current audio data.

In yet another illustrative, non-limiting embodiment, a method may include receiving, by an IHS from an HMD, SLAM data comprising a first plurality of packets; and at least one of: in response to a determination that the SLAM data is advanced by at least a first threshold value, dropping one or more of the first plurality of packets; or in response to a determination that the SLAM data is lagged by at least the first threshold value, transforming lagged SLAM data into current SLAM data.

The method may also include: receiving, from the HMD, WFC or GRT data comprising a second plurality of packets; and at least one of: in response to a determination that the WFC or GRT data is advanced by at a second threshold value, dropping one or more of the second plurality packets; or in response to a determination that the WFC or GRT data is lagged by at least the second threshold value, transforming lagged WFC or GRT data into current WFC or GRT data.

The method may further comprise receiving, from the HMD, EGT data comprising a third plurality of packets; and at least one of: in response to a determination that the EGT data is advanced by at least a third threshold value, dropping one or more of the third plurality packets; or in response to a determination that the EGT data is lagged with respect to the synchronized time by at least the third threshold value, transforming lagged EGT data into current EGT data. The method may further include receiving, from the HMD audio data; and in response to a determination that the audio data is advanced or lagged with by at least a fourth threshold value, synchronizing the audio data with the SLAM data.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Embodiments described herein provide systems and methods for adaptive backchannel synchronization for virtual, augmented, or mixed reality (xR) applications in edge cloud architectures. These techniques are particularly useful in xR applications that employ Head-Mounted Devices (HMDs), Heads-Up Displays (HUDs), and eyeglasses—collectively referred to as "HMDs."

Figure 1A:
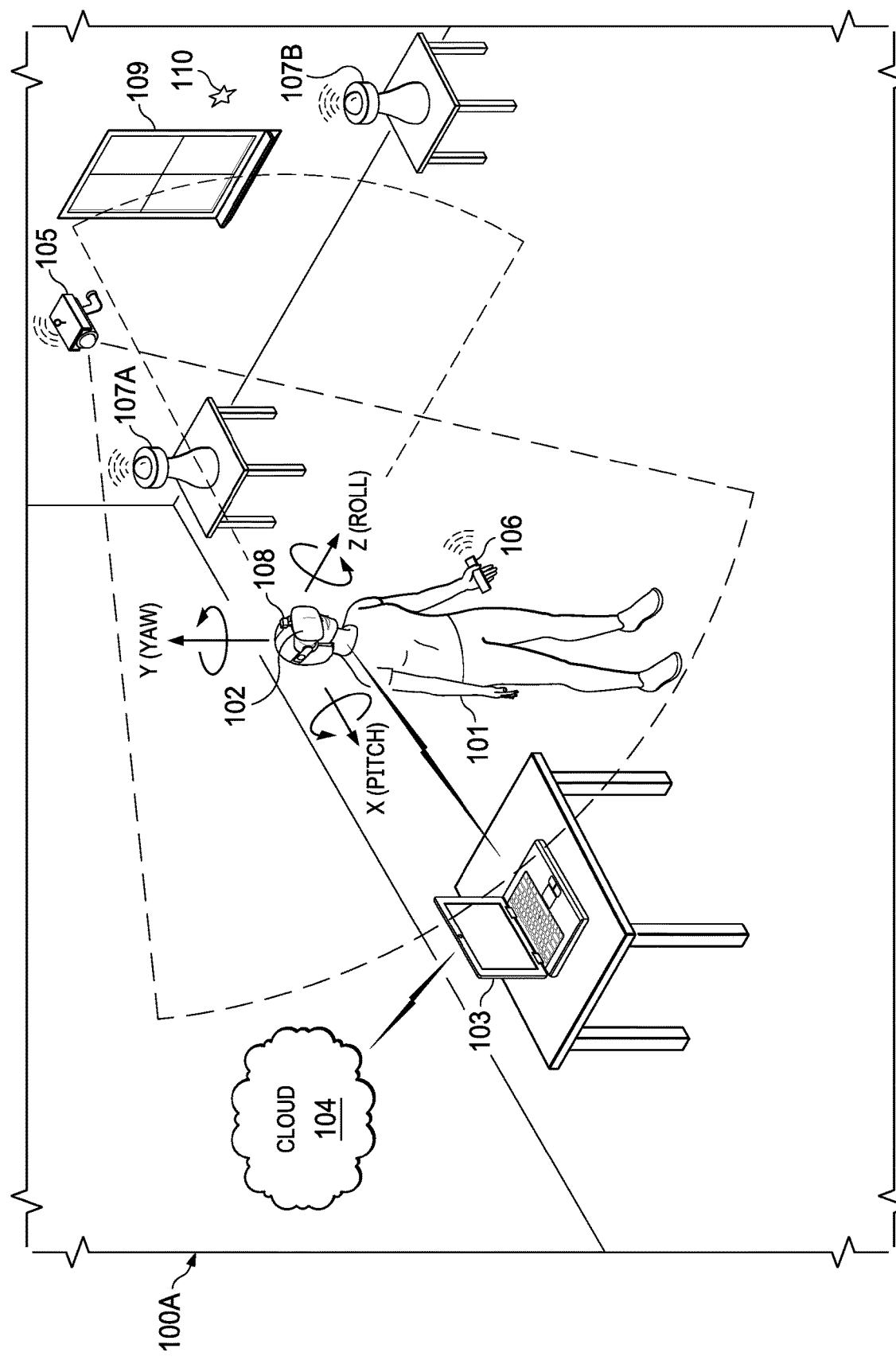
FIGS. 1A-D illustrate an example of an environment where a virtual, augmented, or mixed reality (xR) application may be executed, according to some embodiments.

FIG. 1A is a perspective view of environment 100A where an xR application is executed. As illustrated, user 101 wears HMD 102 around his or her head and over his or her eyes. In this non-limiting example, HMD 102 is tethered to host Information Handling System (IHS) 103 via a wired or wireless connection. In some cases, host IHS 103 may be built into (or otherwise coupled to) a backpack or vest, wearable by user 101.

In various applications, two or more users may be in the same environment or room 100A such that their respective HMDs may be said to be co-located. For example, co-located HMDs may be within a predefined physical distance from each other (e.g., up to 10 meters), and each HMD worn by each user may be coupled to a distinct IHS. As noted above, in some cases, the IHS serving a particular HMD may be part of an edge cloud architecture.

In environment 100A, the xR application may include a subset of components or objects operated by HMD 102 and another subset of components or objects operated by host IHS 103. Particularly, host IHS 103 may be used to generate digital images to be displayed by HMD 102. HMD 102 transmits information to host IHS 103 regarding the state of user 101, such as physical position, pose or head orientation, gaze focus, etc., which in turn enables host IHS 103 to determine which image or frame to display to the user next, and from which perspective.

As user 101 moves about environment 100A, changes in: (i) physical location (e.g., Euclidian or Cartesian coordinates x, y, and z) or translation; and/or (ii) orientation (e.g., pitch, yaw, and roll) or rotation, cause host IHS 103 to effect a corresponding change in the picture or symbols displayed to user 101 via HMD 102, in the form of one or more rendered video frames.

Movement of the user's head and gaze may be detected by HMD 102 and processed by host IHS 103, for example, to render video frames that maintain visual congruence with the outside world and/or to allow user 101 to look around a consistent virtual reality environment. In some cases, xR application components executed by HMD 102 and IHS 103 may provide a cooperative, at least partially shared, xR environment among a plurality of users. For example, each user may wear their own HMD tethered to a different host IHS, such as in the form of a video game or a productivity application (e.g., a virtual meeting).

Today, most HMD 102's processing is limited and restricted to some amount of pre-processing, with Simultaneous Localization and Mapping (SLAM) camera frames being sent to IHS 103 for further processing. Data transmitted from HMD 102 to IHS 103 is said to be transmitted over a "back-channel," whereas data transmitted from IHS 103 to HMD 102 is said to be transmitted over a "forward-channel."

It is important for a client node (i.e., HMD/IHS pair) to operate in cohesion and to optimize compute, increase accuracy, and reduce redundancy—while maintaining low latency of mapping updates. Particularly for users operating in a multi-user, edge cloud compute environment, it is important to maintain synchronization among the various back-channel workstreams such as, for example: SLAM data, Eye Gaze Tracking (EGT) data, World Facing Camera (WFC) data, Gesture Recognition and Tracking (GRT) data, and Audio input (A_IN) data.

Because SLAM data streams are communicated via lossy and band-limited channels, packets in those data streams may arrive at IHS 103 out of order and may be out of synchronization with respect to other back-channel data streams. Accordingly, in various embodiments described herein, systems and methods for adaptive backchannel synchronization may enable catching up one or more workstreams or retarding them, to place them in sync with SLAM and to be able to tag them together with a SLAM timestamp by IHS 103.

Figure 1B:
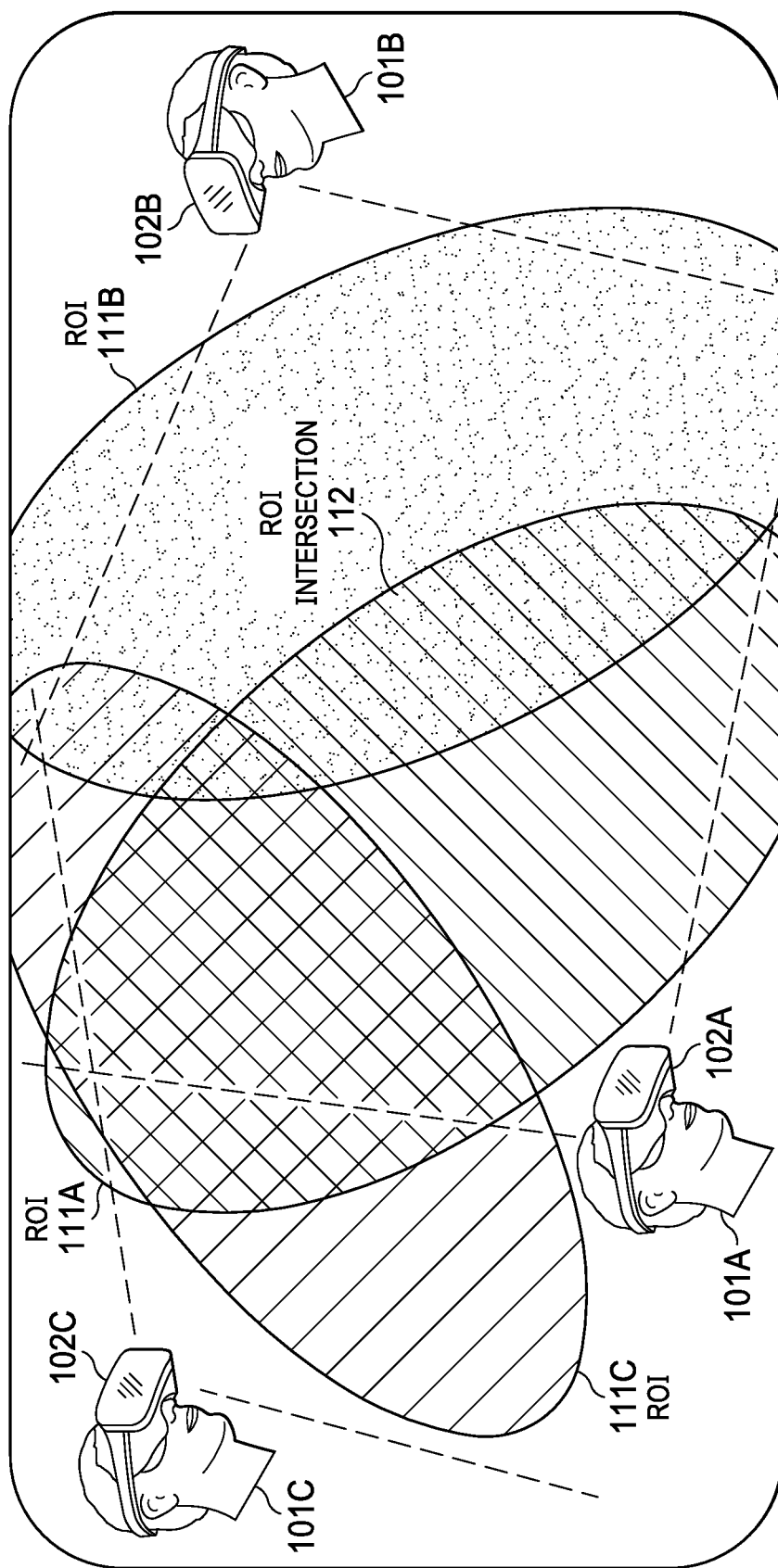

FIG. 1B shows a co-located multi-user xR implementation with three participants 101A-C, each participant wearing their own HMD 102A-C. In some cases, each of HMDs 102A-C may be tethered to its own dedicated IHS 103A-C. Alternatively, a first number M of HMDs and a second number N of IHSs may be used (e.g., one IHS "server" for two HMD "clients," etc.). In this example, it is assumed that each of the IHSs may have different compute capabilities; and that all HMDs are using inside-out Extended Kalman Filtering (EKF) Simultaneous Localization and Mapping (SLAM) tracking, with wide mapping field of view up to 360 degrees (e.g., with surround sensors and/or cameras).

In distributed SLAM, co-located client nodes perform SLAM collaboratively to create a map (a "SLAM map") of their shared physical space. For example, multiple HMDs may be co-located in a given space, and their supporting IHSs may be either co-located or part of an edge cloud architecture. In various implementations, distributed SLAM requires that client nodes exchange information with other client nodes via communication channels that are lossy and/or band-limited.

As such, each HMD 102A-C may include an instance of inside-out camera 108 configured to capture IR/NIR frames, and therefore sends those frames and associated data (SLAM data) to its respective IHS 103A-C. Then, each IHS 103A-C determines one or more Regions-of-Interest (ROIs) 111A-C within the HMD 102A-C's respectively captured frames and/or field-of-view (FOV), and performs one or more SLAM operations upon the SLAM data obtained for each ROI. In some cases, an ROI may be equal to an FOV plus a delta 3D range for anticipatory movements.

Depending upon the position and pose of each HMD, ROI intersection area 112 may occur, for example, such that redundant or duplicate calculations are performed by HMDs 102A-C for landmarks found in that intersection.

Figure 1C:
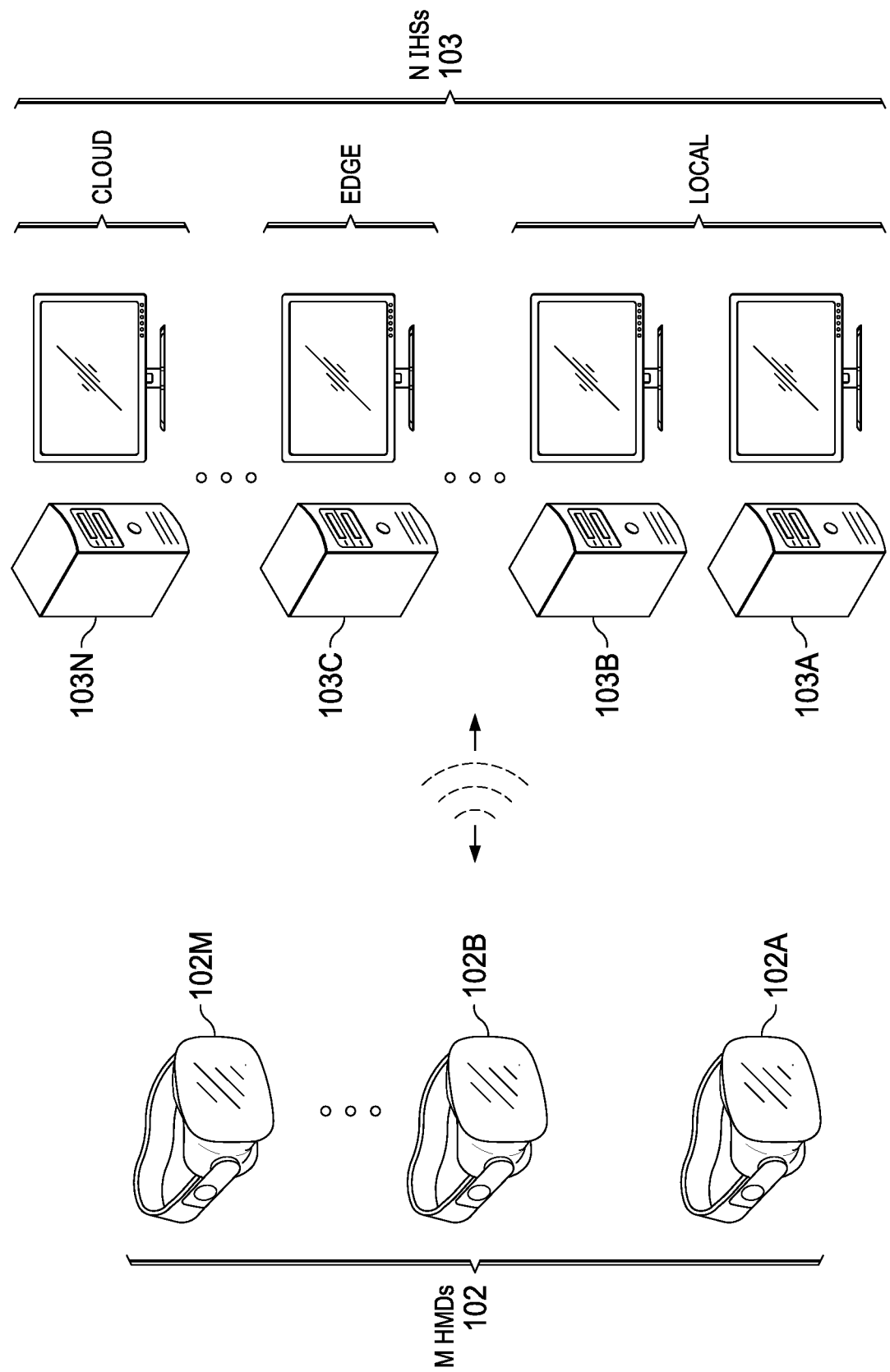

FIG. 1C shows HMD client nodes 102A-M connected wired/wirelessly in a mesh ad-hoc network architecture to IHS server nodes 103A-N. In some architectures, one of IHS nodes 103A-N (e.g., the first node to start the xR collaboration session) may be responsible for session control actions, but otherwise the network may remain without a central server. Additionally, or alternatively, remote edge server 103C and/or remote cloud server 103N may enable co-located IHSs 103A and 103B (with respect to HMDs 102A-M) to offload xR processing and/or additional operations to it, as part of an edge cloud architecture, or the like.

Figure 1D:
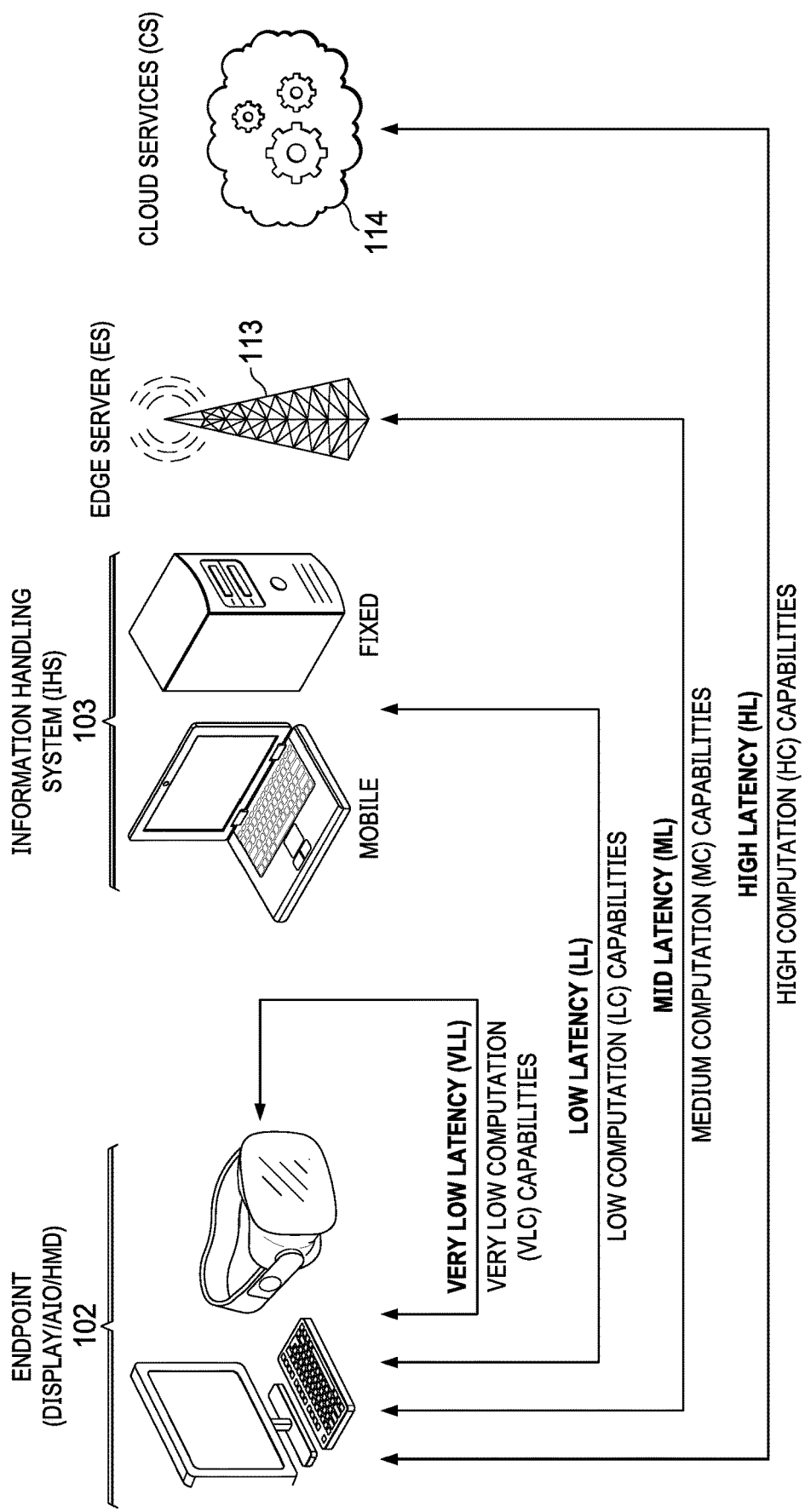

FIG. 1D shows an example of an edge cloud compute architecture usable by any of HMD client nodes 102A-M to access a respective one of IHS nodes 103A-N, according to some embodiments. In this example, edge server 113 may be in close proximity to the last mile of a wireless network serving HMD 102 and/or IHS 103; that is, at the edge of that network. In contrast, cloud server 114 may include any virtualized or physical IHS that provides computation and data storage services remotely through the Internet, or the like. Different levels of round-trip latency are involved in communications between a given HMD and respective ones of co-located IHS 103, edge server 113, and cloud server 114, increasing from left to right.

In some cases, HMD 102 may be an all-in-one (AIO) device with enough compute power to operate untethered from any IHS, such that all processing is entirely performed by HMD 102, which results in Very Low Latency (VLL) processing. Additionally, or alternatively, HMD 102 may be tethered to a co-located IHS 103, mobile (e.g., backpack or vest) or fixed (e.g., on a desk), such that the external IHS 103's compute resources are used, resulting in Low Latency (LL) processing/communications.

Additionally, or alternatively, HMD 102 may be configured to use compute resources available at edge server 113 (directly or via indirectly via IHS 103), resulting in Mid Latency (ML) processing/communications. Additionally, or alternatively, HMD 102 may be configured to use compute resources available at cloud server 114 (directly or via indirectly via IHSs 103 and/or 113), resulting in High Latency (HL) processing/communications.

In some implementations, VLL may have a round-trip latency smaller than 20 ms, LL may have a round-trip latency between 20 ms and 50 ms, ML may have a round-trip latency between 50 ms and 200 ms, and HL may have a round-trip latency greater than 200 ms.

The example edge cloud architecture of FIG. 1D also has different levels of computation resources available, increasing in capabilities from left (102) to right (114). Particularly, HMD 102 is deemed to have Very Low Computation (VLC) capability, co-located IHS 103 has Low Computation (LC) capabilities, edge server 113 has Medium Computation (MC) capabilities, and cloud server 114 has High Computation (HC) capabilities.

For example, HC may include a deep learning and object recognition pipeline, MC may include dense SLAM compute and/or VR ready-line graphics (e.g., in Kflops/pixel), and LC may include Dynamic Time Warping (DTW), whereas VLC may implement constrained channel bitrate adaptation mechanisms. In some cases, each of computation capacities VLC-HC may be quantified on a scale (e.g., numerically) with respect to an amount of processing power, access to data, and/or ability to perform complex algorithms such as machine learning, object recognition, tagging, etc.

In some implementations, each IHS node in an edge cloud compute architecture may be further characterized by its ability to process video frames captured by HMD 102, for example, to perform SLAM computations. For instance, IHS 103 may be capable of performing SLAM computations at 30 frames-per-second (FPS), edge server 113 may perform SLAM computations at 10 FPS, and cloud server 114 may perform SLAM computations at 1 FPS.

In the case of co-located users in an edge cloud architecture, it becomes important to optimize the performance of SLAM operations (e.g., compute, accuracy) executed by the various HMDs and their respective IHSs. Additionally, it is important to have a scalability mechanism for the edge cloud architecture to operate in cohesion, optimize compute, and speed up mapping (e.g., localization and tracking map updates); while improving accuracy and maintaining low latency of updates.

Figure 2:
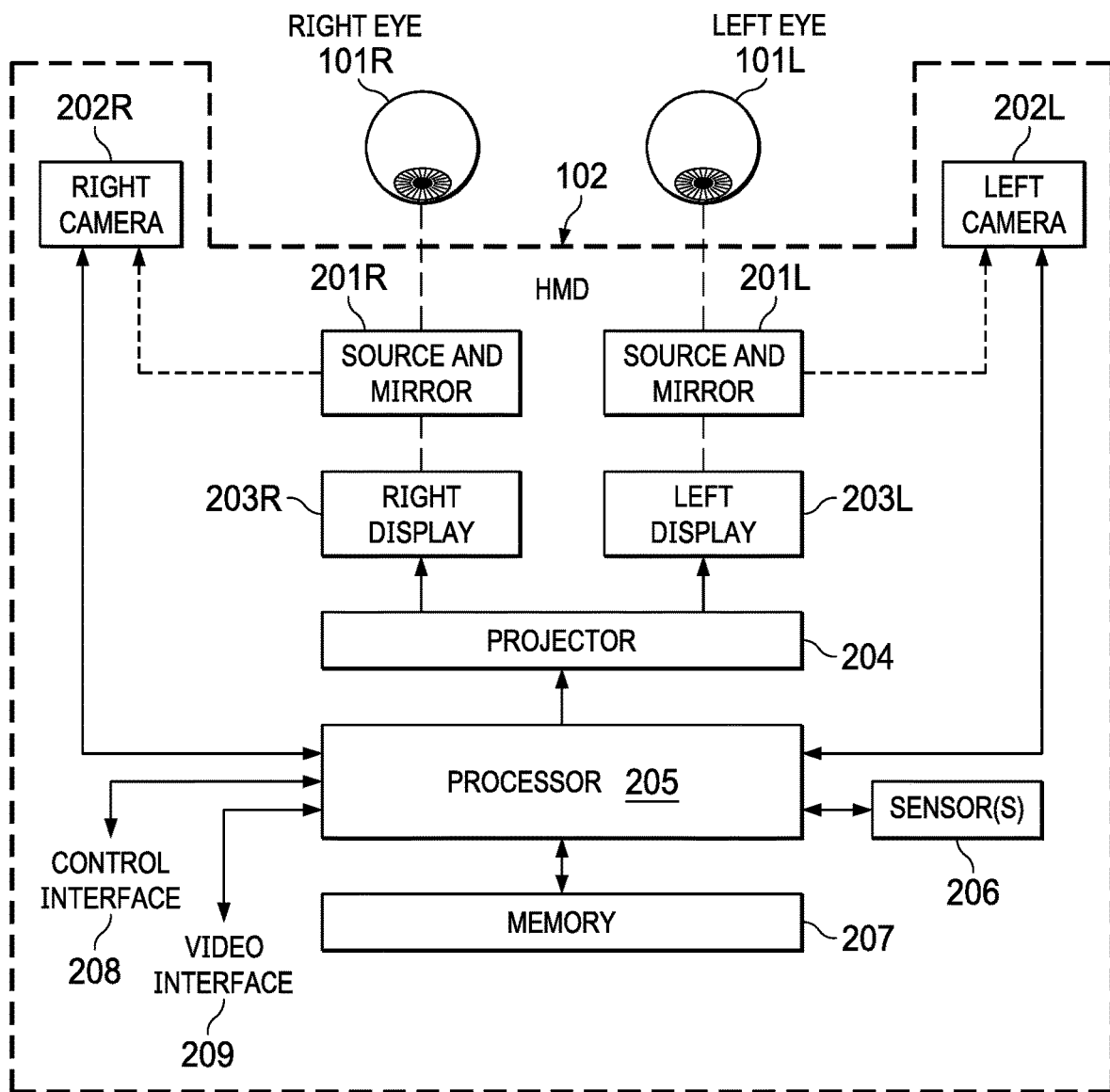
FIG. 2 illustrates an example of electronic components of a Head-Mounted Display (HMD), according to some embodiments.

FIG. 2 illustrates an example of electronic components of HMD 102. In some embodiments, HMD 102 comprises a projection system that includes projector 204 configured to display image frames, including stereoscopic right and left images, on right and left displays 203R and 203L that are viewed by a user right and left eyes 101R and 101L, respectively. Such a projection system may include, for example, a Digital Light Processing (DLP), a Liquid Crystal Display (LCD), or the like. To create a three-dimensional (3D) effect in a 3D virtual view, virtual objects (VOs) may be rendered at different depths or distances in the two images.

HMD 102 includes processor 205 configured to generate frames that are displayed by projector 204. Hardware memory 207 is configured to store program instructions executable by processor 205, as well as other data. In other embodiments, however one or more operations described for processor 205 may be implemented by a different processor within IHS 103.

Accordingly, in some embodiments, HMD 102 may also include control interface 208 and video interface 209 (e.g., a Bluetooth technology interface, USB interface, etc.) configured to communicate with IHS 103. Control interface 208 may provide forward and backward communication channels between HMD 102 and IHS 103, depending upon the architecture of the xR system, to facilitate execution of an xR application. For example, program instructions stored in memory 207, when executed by processor 205, may cause frames captured by camera(s) 108 to be transmitted to IHS 103 via control interface 208.

IHS 103 may in turn execute SLAM module 403 (FIG. 4), for example, based upon landmarks found in the video frames received from camera 108. Particularly, SLAM module 403 may be configured to implement tracking techniques that use distinctive visual characteristics of the physical environment to identify specific images or shapes which are then usable to calculate HMD 102's position and orientation. Then, rendering engine 406 (FIG. 4) may use data from SLAM module 403 to render an image to be provided to projector 204 via video interface 209 (e.g., High-Definition Multimedia Interface or "HDMI," Digital Visual Interface or "DVI," DISPLAYPORT, etc.). In some cases, video interface 209 may include two separate video interfaces, one for each display 203R/L. Additionally, or alternatively, a single interface that supports multi-stream may be used to drive both displays 203R/L.

In some embodiments, HMD 102 may include one or more sensors 206 that collect information about the user's environment (e.g., video, depth, lighting, motion, etc.) and provide that information to processor 205. Sensors 206 may include, but are not limited to, inside-out cameras, outside-in cameras, eye tracking cameras, RGB cameras, gesture cameras, infrared (IR) or near-IR (NIR) cameras, SLAM cameras, etc. Additionally, or alternatively, sensors 206 may include electric, magnetic, radio, optical, infrared, thermal, force, pressure, acoustic, ultrasonic, proximity, position, deformation, movement, velocity, rotation, gyroscopic, and/or acceleration sensor(s). In some cases, sensors 206 may be coupled to processor 205 via a sensor hub.

HMD 102 may be configured to render and display frames to provide an xR view for user 101 according to inputs from sensors 206. For example, an xR view may include renderings of the user's real-world environment based on video captured by camera 108. The xR view may also include virtual objects composited with the projected view of the user's real environment.

Still referring to FIG. 2, right and left Near Infra-Red (NIR) light sources 201R and 201L (e.g., NIR LEDs) may be positioned in HMD 102 to illuminate the user's eyes 101R and 101L, respectively. Mirrors 201R and 201L (e.g., "hot mirrors") may be positioned to direct NIR light reflected from eyes 101R and 101L into EGT cameras 202R and 202L located on each side of the user's face. In other implementations, instead of EGT cameras 202R and 202L, a single EGT camera, or a combination of a wide-angle camera with and a narrower-angle camera, may be used.

EGT information captured by cameras 202R and 202L may be provided to processor 205 to be further processed and/or analyzed. For example, processor 205 may adjust the rendering of images to be projected, and/or it may adjust the projection of the images by the projector 204 based on the direction and angle at which eyes 101R/L are looking. Additionally, or alternatively, processor 205 may estimate the point of gaze on right and left displays 203R and 203L to enable gaze-based interaction with xR content shown on those displays.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Figure 3:
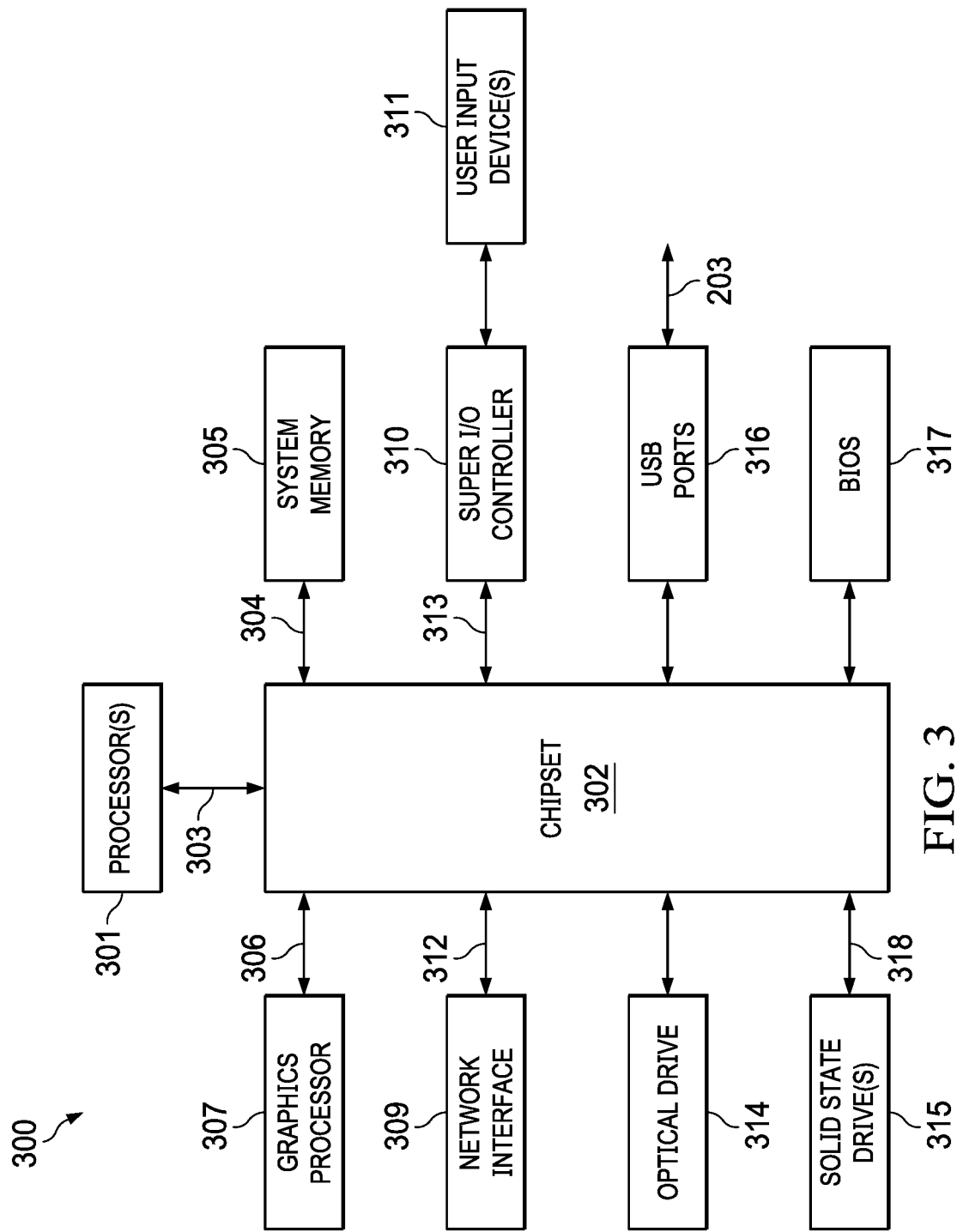
FIG. 3 illustrates an example of electronic components of an Information Handling System (IHS), according to some embodiments.

FIG. 3 is a block diagram of IHS 300 configured to implement host IHS 103, according to certain embodiments. As shown, IHS 300 may include one or more processors 301. In various implementations, IHS 300 may be a single-processor system including one processor 301, or a multi-processor system including two or more processors 301. Processor(s) 301 may include any processor capable of executing program instructions, such as an Intel Pentium™ series processor or any general-purpose or embedded processors having any of a variety of Instruction Set Architectures (ISAs), such as the x86, POWERPC®, ARM®, SPARC®, or MIPS® ISAs, or any other suitable ISA.

IHS 300 includes chipset 302 that may include one or more integrated circuits that are connect to processor(s) 301. In certain embodiments, chipset 302 may utilize QuickPath Interconnect (QPI) bus 303 for communicating with the processor(s) 301. Chipset 302 provides the processor(s) 301 with access to a variety of resources. For instance, chipset 302 provides access to system memory 305 over memory bus 304. System memory 305 may be configured to store program instructions and/or data accessible by processors(s) 301. In various embodiments, system memory 305 may be implemented using any suitable memory technology, such as static RAM (SRAM), dynamic RAM (DRAM) or nonvolatile/Flash-type memory.

Chipset 302 may also provide access to graphics processor 307. In certain embodiments, graphics processor 307 may be comprised within one or more video or graphics cards that have been installed as components of IHS 300. Graphics processor 307 may be coupled to the chipset 302 via a graphics bus 306 such as provided by an Accelerated Graphics Port (AGP) bus or a Peripheral Component Interconnect Express (PCIe) bus. In certain embodiments, graphics processor 307 generates display signals and provides them to HMD device 102 via video interface 204.

In certain embodiments, chipset 302 may also provide access to one or more user input devices 311. In such embodiments, chipset 302 may be coupled to a super I/O controller 310 that provides interfaces for a variety of user input devices 311, in particular lower bandwidth and low data rate devices. For instance, super I/O controller 310 may provide access to a keyboard and mouse or other peripheral input devices. In certain embodiments, super I/O controller 310 may be used to interface with coupled user input devices 311 such as keypads, biometric scanning devices, and voice or optical recognition devices, through wired or wireless connections. In certain embodiments, chipset 302 may be coupled to the super I/O controller 310 via a Low Pin-Count (LPC) bus 313.

Other resources may also be coupled to the processor(s) 301 of IHS 300 through the chipset 302. In certain embodiments, chipset 302 may be coupled to a network interface 309, such as provided by a Network Interface Controller (NIC) that is coupled to IHS 300. In certain embodiments, the network interface 309 may be coupled to the chipset 302 via a PCIe bus 312. According to various embodiments, network interface 309 may support communication via various wired and/or wireless networks. In certain embodiments, the chipset 302 may also provide access to one or more Universal Serial Bus (USB) ports 316; which in some implementations may serve as transport for establishing control interface 203 with HMD 102.

Chipset 302 also provides access to one or more solid-state storage devices 315. The chipset 302 utilizes a PCIe bus interface connection 318 in order to communicate with the solid-state storage device 315. In certain embodiments, chipset 302 may also provide access to other types of storage devices. For instance, in addition to the solid-state storage device 315, an IHS 300 may also utilize one or more magnetic disk storage devices, or other types of the storage devices such as an optical drive or a removable-media drive. In various embodiments, the solid-state storage device 315 may be integral to IHS 300, or may be located remotely from IHS 300.

Another resource that may be accessed by processor(s) 301 via chipset 302 is a Basic Input/Output System (BIOS) 317. As described in more detail below with respect to additional embodiments, upon powering or restarting IHS 300, processor(s) 301 may utilize BIOS 317 instructions to initialize and test hardware components coupled to IHS 300 and to load an operating system for use by IHS 300. BIOS 317 provides an abstraction layer that allows the operating system to interface with certain hardware components that are utilized by IHS 300. Via this hardware abstraction layer provided by BIOS 317, the software executed by the processor(s) 301 of IHS 300 is able to interface with certain I/O devices that are coupled to IHS 300. As used herein, the term "BIOS" is intended to also encompass Unified Extensible Firmware Interface (UEFI).

In various embodiments, HMD 102 and/or host IHS 103 may not include each of the components shown in FIGS. 2 and 3, respectively. Additionally, or alternatively, HMD 102 and/or host IHS 103 may include various components in addition to those that are shown in FIGS. 2 and 3. Furthermore, some components that are represented as separate components in FIGS. 2 and 3 may, in some embodiments, be integrated with other components. For example, in various implementations, all or a portion of the functionality provided by the illustrated components may instead be provided by components integrated into the one or more processor(s) as a system-on-a-chip (SOC) or the like.

Figure 4:
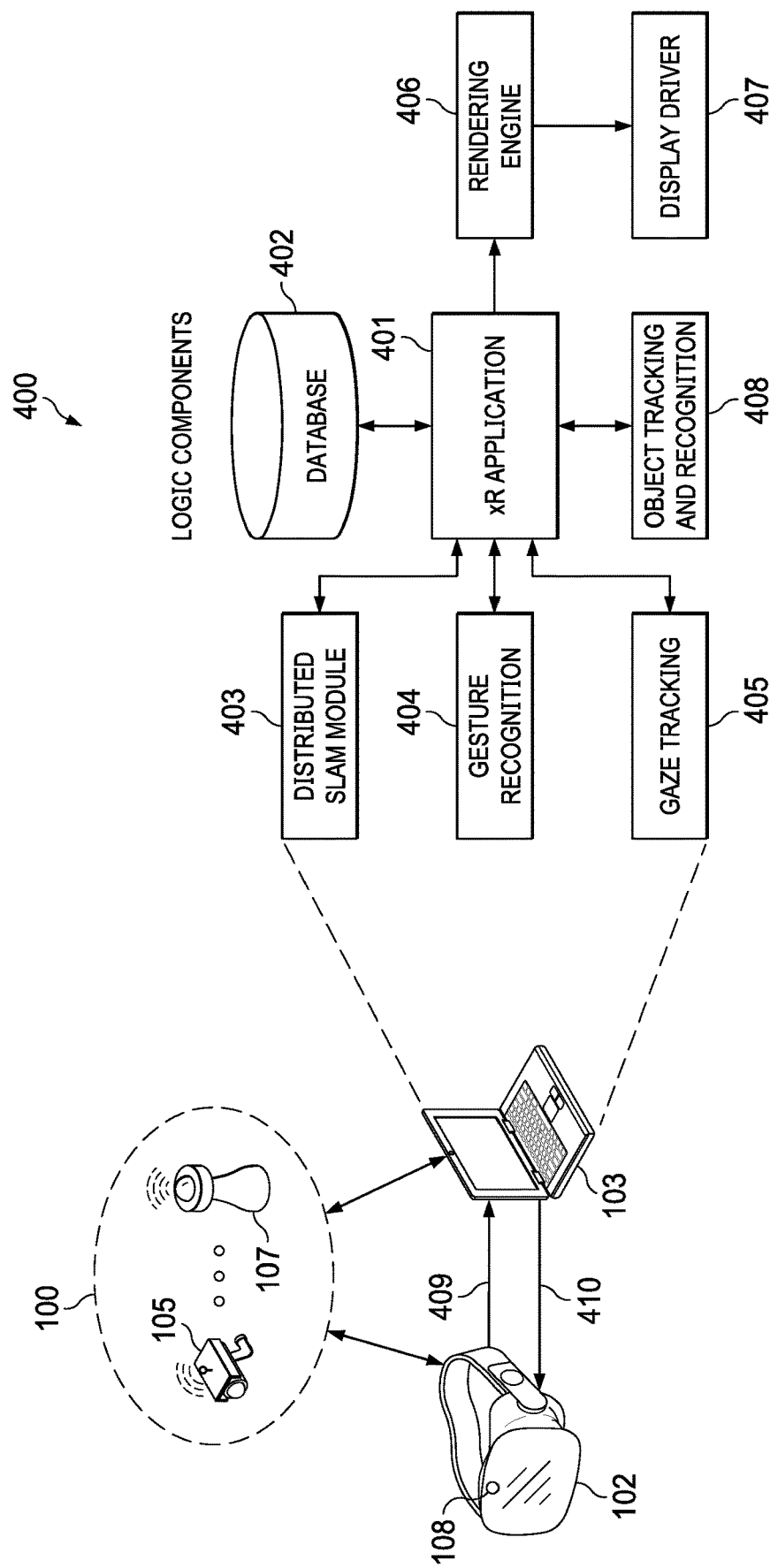
FIG. 4 illustrates an example of logic components of an xR application, according to some embodiments.

FIG. 4 illustrates logic components 400 of xR application 401. Generally, xR application 401 may include any xR application now existing or yet to be developed, including, but not limited to: entertainment, video games, robotics, healthcare, education and training, military uses, occupational safety, engineering, industrial or product design, collaboration applications, virtual meetings, etc.

Distributed SLAM module 403 uses positional tracking devices among camera(s) and sensor(s) 202 (e.g., in the IR spectrum) to construct a map of an unknown environment where an HMD is located, which simultaneously identifies where the HMD is located, its orientation, and/or pose.

Generally, distributed SLAM module 403 may include a propagation component, a feature extraction component, a mapping component, and an update component. The propagation component may receive angular velocity and accelerometer data from an Inertial Measurement Unit (IMU) built into HMD 102, for example, and it may use that data to produce a new HMD position and/or pose estimation. A camera (e.g., a depth-sensing camera) may provide video frames to the feature extraction component, which extracts useful image features (e.g., using thresholding, blob extraction, template matching, etc.), and generates a descriptor for each feature. These features, also referred to as "landmarks," are then fed to the mapping component.

The mapping component may be configured to create and extend a map, as HMD 102 moves in space. Landmarks may also be sent to the update component, which updates the map with the newly detected feature points and corrects errors introduced by the propagation component. Moreover, the update component may compare the features to the existing map such that, if the detected features already exist in the map, the HMD's current position may be determined from known map points.

To enable positional tracking for SLAM purposes, HMD 102 may use wireless, inertial, acoustic, or optical sensors among sensor(s) 202. And, in many embodiments, each different SLAM method may use a different positional tracking source or device. For example, wireless tracking may use a set of anchors or lighthouses 107A-B that are placed around the perimeter of environment 100A and/or one or more totems 106 or tags 110 that are tracked; such that HMD 102 triangulates its position and/or state using those elements. Inertial tracking may use data from an accelerometer and/or gyroscope within HMD 102 to find a velocity (e.g., m/s) and position of HMD 102 relative to some initial point. Acoustic tracking may use ultrasonic sensors to determine the position of HMD 102 by measuring time-of-arrival and/or phase coherence of transmitted and received sound waves.

Optical tracking may include any suitable computer vision algorithm and tracking device, such as a camera of visible (RGB), IR, or NIR range, a stereo camera, and/or a depth camera. With inside-out tracking using markers, for example, camera 108 may be embedded in HMD 102, and infrared markers 107A-B or tag 110 may be placed in known stationary locations. With outside-in tracking, camera 105 may be placed in a stationary location and infrared markers 106 may be placed on HMD 102 or held by user 101. In others cases, markerless inside-out tracking may use continuous searches and feature extraction techniques from video frames obtained by camera 108 (e.g., using visual odometry) to find natural visual landmarks (e.g., window 109) in environment 100A.

An estimator, such as an Extended Kalman filter (EKF), may be used for handling the propagation component of an inside-out SLAM method. A map may be generated as a vector stacking sensors and landmarks states, modeled by a Gaussian variable. The map may be maintained using predictions (e.g., when HMD 102 moves) and/or corrections (e.g., camera 108 observes landmarks in the environment that have been previously mapped). In other cases, a map of environment 100A may be obtained, at least in part, from cloud 104.

For example, HMD 102 may capture IR/NIR frames (e.g., from camera 108), perform image pre-processing operations, generate object detection of landmarks using feature extraction techniques, and send SLAM data (e.g., pixel values for each pixel in the ROI, along with IR/NIR frame data, coordinates of detected landmarks, etc.) to host IHS 103. Host IHS 103 may perform EKF operations for each detected landmark and it may calculate a Kalman Gain (G) for each landmark (L), which in turn indicates a confidence or probability of the landmark's measured location being accurate.

In some cases, the consumption of IHS 103's hardware resources (e.g., CPU, GPU, memory, etc.) during operation of a SLAM method may be dependent upon the order or dimension of a square covariance matrix of landmark data (or other features extracted from sensor data). Particularly, IHS hardware resource utilization may be dominated by $O(M^2)$, where M is the number of landmarks detected: if M* is smaller than M, then host hardware utilization is reduced by $(M^2-M^{*2})/M^2 \times 100\%$. For example, if there are 100 landmarks detected (M=100), but only 50 landmarks are used (M=50), the reduction in utilization may be of 75%.

In various embodiments, distributed SLAM module 403 may be configured to sort or rank detected landmarks by confidence, probability, or priority; generate a cutoff based upon a desired or expected amount of resource utilization reduction (e.g., compute load) using calibration data; and employ only a selected subset of all available landmarks (e.g., the M* highest-ranked of M landmarks to be used; M*<M) to generate covariance matrices to be used by the SLAM method thereafter.

In some embodiments, calibration of number of landmarks versus average CPU load (or any other IHS hardware resource) may be performed for the space where the user is engaging in an xR experience, and a calibration curve may be stored in database 402. The calibration curve provides a baseline for the space and the HMD-Host combination; but it should be noted that the process is specific to an HMD, the host IHS being used, and their environment. Calibration may also be used to select an optimal number M of sorted landmarks to use in steady state as the maximum number of landmarks to compute (e.g., a user may set the maximum permitted CPU load for SLAM at 10%, which limits the number of landmarks to 50).

Distributed SLAM module 403 may receive and rank all landmarks detected by HMD 102A (and other HMDs 102B-C and/or their respective IHSs), for example, using EKF. Particularly, EKF may be used to estimate the current state of a system based on a previous state, current observations, and estimated noise or error. A state is defined as a 1×N vector, where N is the number of measurements in a state. The primary relationship for an EKF defines a state transition as:

(New State)=(Old State)+$G$((Current Observation)−(Old State))

where G is known as the Kalman Gain. The value of G is based on average noise and/or measurement error over time, and it determines how much the current observation can be trusted.

The system state in an EKF for SLAM may be a 1×(6+3N) vector, where N is the number of landmarks. In that case, there may be 3 coordinates (e.g., x, y, z) for each landmark, and 6 coordinates (e.g., x, y, z, pitch, roll, yaw) for the user. Landmarks may be any static points in space that can be re-observed at a later state to determine how the system changed (a good landmark is easily identifiable and does not move, such as a wall, window, power outlet, etc.).

In various implementations, a matrix or table of size $(6+3N)^2$ stores the covariance between every pair of state measurements, and may be used when determining the Kalman Gain for a given landmark. The Kalman Gain may be used to determine how much to change every other state measurement based on the re-observed location of a single landmark: a greater Kalman Gain means that the landmark's new position may be trusted and used to update the system's state. Conversely, a Kalman Gain of zero means the position cannot be at all trusted and therefore the landmark should be ignored.

The use of EKF by distributed SLAM module 403 may be divided into 3 parts. The first part updates the current state from user movement. Motion may be described by the IMU data on the HMD, and the user's position and every known landmark's position may be estimated and updated. The second part uses re-observed landmarks via laser scanner or object recognition to update current state (both user position and landmark positions) more accurately than using IMU data, calculates G for the re-observed landmark, and updates the system accordingly. As noted above, G may be a vector showing how much to update every state variable based on the landmark's new position. The third part adds newly-observed landmarks to the system's state. Adding new landmarks adds to the dimensionality of the system state and covariance matrix, such that the algorithm runs on the order of $O(N^2)$, where N is the number of used landmarks.

To rank the landmarks, distributed SLAM module 403 may create a list of landmarks indices, sort the landmark indices by the Kalman Gain of corresponding landmarks, and produce a ranked or sorted list of all detected landmarks. Distributed SLAM module 403 may select a subset of landmarks, and IHS 103 produces an xR environment displayed by HMD 102 based on SLAM processing using only the selected subset of landmarks.

Gesture recognition module 404 may also use one or more cameras or optical sensors 202 that enable user 101 to use their actual hands for interaction with virtual objects (VOs) rendered by display 205 within HMD 102. For example, gesture recognition module 404 may be configured to implement hand tracking and gesture recognition in a 3-D space via a user-facing 2-D camera. In some cases, gesture recognition module 404 may track a selectable number of degrees-of-freedom (DOF) of motion, with depth information, to recognize dynamic hand gestures (e.g., swipes, clicking, tapping, grab and release, etc.) usable to control or otherwise interact with xR application 401.

Gaze tracking module 405 may use an inward-facing projector, configured to create a pattern of infrared or (near-infrared) light on the user's eyes, and an inward-facing camera configured to take high-frame-rate images of the eyes and their reflection patterns; which are then used to calculate the user's eye's position and gaze focus or point. In some cases, gaze tracking module 405 may be configured to identify a direction, extent, and/or speed of movement of the user's eyes in real-time, during execution of an xR application (e.g., a gaze vector). In addition, gaze tracking module 405 may be configured to calculate a region-of-interest of configurable size or shape (e.g., circular, rectangular, etc.), based in part upon the gaze vector.

In various implementations, gaze tracking module 405 may use, among camera(s) and/or sensor(s) 202, NIR light sources to produce glints on the surface of the cornea of the user's eye, and then it may capture images of the eye region using an inward-facing camera. Gaze tracking module 405 may estimate the user's gaze from the relative movement between the pupil center and glint positions. Particularly, an eye and/or gaze tracking algorithm may perform corneal reflection-based calculations that use NIR illumination to estimate the gaze direction or the point of gaze using polynomial functions, or a geometrical model of the human eye.

Gaze tracking module 405 may perform any of a plurality of different EGT methods. For example, in two-dimensional (2D) regression-based EGT methods, a vector between the pupil center and a corneal glint may be mapped to corresponding gaze coordinates on the frontal screen using a polynomial transformation function. Conversely, three-dimensional (3D)-based EGT methods may use a geometrical model of the human eye to estimate the center of the cornea, optical and visual axes of the eye, and to estimate the gaze coordinates as points of intersection where the visual axes meets the scene.

As such, gaze tracking module 405 may be configured to follow the user's gaze direction for natural exploration of a visual scene by capturing the user's visual perspective. In some cases, pupil motion may be tracked to estimate a user's viewing point, with Kalman filtering to minimize pupil jitter and drifts. Moreover, gaze tracking module 405 may be used to calculate or adjust the user's field-of-view (FOV).

Rendering engine 406 may include any engine (e.g., UNITY, UNREAL, AUTODESK, etc.) configured to render an xR model displayed by HMD 102 from user 101's unique point-of-view based upon the user's coordinate location (e.g., from distributed SLAM module 403), the user's pose (e.g., IMU), and/or the user's gaze (e.g., from gaze tracking module 405). Display driver 407 is coupled to rendering engine 406 and configured to convert rendered video frames to a display format that HMD 102 can reproduce before the user's eyes.

Object tracking and recognition module 408 may implement any object identification or detection technique based on visual images, including, but not limited to: edge detection, corner detection, blob detection, ridge detection, or the like. In some cases, object tracking and recognition module 408 may operate with distributed SLAM module 403 to track the position or movement of objects using landmarks or the like.

Database 402 may include if/then rules with real-world objects and their location, orientation, and/or movement (e.g., angle(s), direction(s), trajector(ies), speed(s), etc.). In some cases, an if/then rule catalog may be filtered based upon the presence or identification of a master object and/or other surrounding, secondary objects in the user's FOV. Database 402 may include different if/then rule catalogs based upon the identity of an authenticated user, for example, as part of a profile. Additionally, or alternatively, if/then rules may be based upon historic continuous usage.

In various embodiments, communication methods described herein may take the form of server-client streaming with different transport layer mechanisms, such as Real-time Transport Protocol (RTP) over User Datagram Protocol (UDP)/Transmission Control Protocol (TCP), or the like. In some implementations, a service may be provided on IHS 103A to: run SLAM on configured ROIs for two or more HMDs 102A-C; receive ROI frames; and calculate landmark information. The service may also: receive absolute pose information related to the other HMDs, from their respective other IHSs; resolve absolute pose coordinates using camera transform matrix on landmarks received; construct a list of landmarks "observed" by all HMDs; and feed the list into the SLAM Application Programming Interface (API) of rendering engine 406.

As such, distributed SLAM module 403 of IHS 103A may not only receive and process SLAM data from that IHS's own HMD 102A, but it may also receive SLAM data from other HMDs 102B/C and/or their respective IHSs, of which one or more may be part of an edge cloud architecture. Rendering engine 406 of IHS 103A may render an updated world space camera view for HMD 102A that is built using ROIs/landmarks found by two or more HMD's IR/NIR camera(s) and/or sensors.

In some embodiments, a method may enable any given one of IHSs 103A-C to construct a map for entire space 100A using its own partial map obtained through HMD 102A, and also from HMD 102B and/or 102C and/or their respective IHSs. During an initial setup procedure, ROIs and capabilities may be established through mesh negotiation. In some cases, the size and position of each HMD's ROI—as a selected subset of pixels in a given frame—may be computed using conventional image processing methods. Each particular HMD 102A-C covers a respective one or more ROIs 111A-C, regardless of FOV (even assuming 360-degree SLAM). Each IHS may receive ROI landmark information obtained through other HMDs from their respective IHSs through IHS-to-IHS communications.

The current IHS (e.g., IHS 103A) may, on a per-HMD basis, resolve overlapping landmarks across ROIs that have intersections 112, including occlusion, etc. For example, if a first HMD detects a landmark that is naturally occluded by another object, from the perspective of a second HMD, the occluded landmark may nonetheless be used to render a map for the second HMD, once SLAM data related to the occluded landmark is obtained from the first HMD and transformed into the second HMD's coordinate system. The current IHS may, on a per-HMD basis, apply a corresponding transform matrix to transform landmarks from one ROI Point-of-View (POV) to the current HMD POV based on each HMD absolute and/or the current HMD's pose. Landmarks from HMDs 102B/C may be rotated, moved up/down, etc. when moved from one user's view to match the view of HMD 102A.

To conceal loss of SLAM data in IHS-to-IHS communications, systems and methods described herein may also take into account the location of the hosts IHSs serving HMDs in an edge cloud architecture. For example, landmarks may be received and/or selected by a given HMD/IHS pair depending upon whether another host IHS performing SLAM calculations for another HMD is characterized by VLL, LL, ML, or HL round-trip latencies. Additionally, or alternatively, landmarks may be received and/or selected depending upon whether the other IHS performing SLAM calculations for the other HMD is characterized by VLC, LC, MC, or HC capabilities or SLAM processing features. Additionally, or alternatively, landmarks may be received and/or selected depending upon a rate at which its IHS processes SLAM data.

Once overlapping landmarks are resolved, they may be corrected for resolved pose, with observed EKFs and relative distances from each user. This data is available to the current IHS for every HMD with which the IHS is in direct communications. The current IHS communicates an HMD map to each HMD via an instance of render engine 406 for that HMD (e.g., IHS 103 may be running multiple render engines, or a single render engine with multi-views).

As used herein, the terms "transformation matrix" or "transform matrix" refer to matrices that determine how objects move around in space. For example, in some cases a transform matrix may be a 4×4 matrix that defines a transformation when applied to objects: translation, rotation and scaling. Translating an object moves it in space, rotating turns an object around its center, and scaling changes the size of an object. To apply a transform to a 3D object, such as a VO, every vertex in the 3D object may be multiplied by the transformation matrix.

When rendering engine 406 is operating, it needs to know where to place the "view camera" (i.e., the point of view for the render) in a given scene, which is done using a view matrix. For example, in some cases a view matrix may be a 4×4 matrix that contains information about the position and orientation of a viewing camera. Every vertex in the scene or frame may be multiplied the view matrix and the scene is rendered by HMD 102 (although the view matrix says how everything else in the scene should change to reflect the point of view of the camera, the camera itself does not move).

The inverse of the view matrix is referred to as the camera transform matrix, which describes how camera 108 itself moves around a scene or frame. That is, the camera transform matrix provides the position and rotation of camera 108.

To illustrate the distinction between a transform matrix and a view matrix, consider a scene that starts with camera 108 looking directly at a chair that is positioned in front of it. The user then turns the camera 45 degrees to the right (a). In this case the camera transform matrix would be a rotation matrix that indicates a 45-degree rotation to the right. The view matrix, however, would be a rotation matrix that indicates 45-degree rotation to the left around the camera's position. In another scene, if the user turns to the left and walks forward, the camera transform matrix would be a rotation matrix to the left followed by a translation matrix forward, which indicates how the user moved in the frame.

For example, if the user looks to the right (and HMD 102 turns right), the camera transform matrix obtained from SLAM sensor data may include a rotation to the right. If the user looks to the left (and HMD 102 turns left), the camera transform matrix obtained from SLAM sensor data may include a rotation to the left. If the user looks up (and HMD 102 turns upward), the camera transform matrix obtained from SLAM sensor data may include a rotation upward. And if the user looks down (and HMD 102 turns downward), the camera transform matrix obtained from SLAM sensor data may include a rotation downward. More generally, rotations around any axis may be performed by taking a rotation around the x axis, followed by a rotation around the y axis, and followed by a rotation around the z axis—such that any spatial rotation can be decomposed into a combination of principal rotations. Moreover, if HMD 102 moves forward, backward, or sideways, the camera transform matrix obtained from SLAM sensor data also reflects the resulting translation.

The term "world space," for xR application 401, refers to a coordinate system that defines where everything is located inside the application. Every object handled by xR application 401 may be given an X, Y and Z coordinate relative to an origin. Once calibrated, HMD sensors can transform their sensor data into world space coordinates. Then, when transform matrices are applied to 3D objects, the objects are moved around in world space. For instance, world space coordinates may be used by xR application 401 to overlay virtual hands directly on-top of the user's real hands.

During execution of xR application 401, HMD 102 transmits SLAM sensor data, EGT sensor data, GRT data, WFC data, audio data, inter-process (IPC) communication data, etc. to IHS 103 via back-channel 409. Meanwhile IHS 103 transmits encoded packetized rendered content (e.g., audio-video) to HMD 102 via forward-channel 410. As part of this process, distributed SLAM module 403 may perform one or more SLAM operations based on the SLAM data. In various embodiments, back-channel 409 and/or forward-channel 410 may be established via any of edge cloud architecture channels with local IHS 103, edge server 113, and/or cloud server 114.

Distributed SLAM module 403 operates upon SLAM data to produce a map of the physical location where the HMD is, using a detected number of landmarks in a given ROI (e.g., the HMD's FOV+/−a delta). In some cases, landmarks may be identified using IR markers disposed in the physical space. Additionally, or alternatively, landmarks in an HMD's ROI may be identified via object recognition operations, for example, with markerless machine learning, using images obtained via a world-facing camera.

Figure 5A:
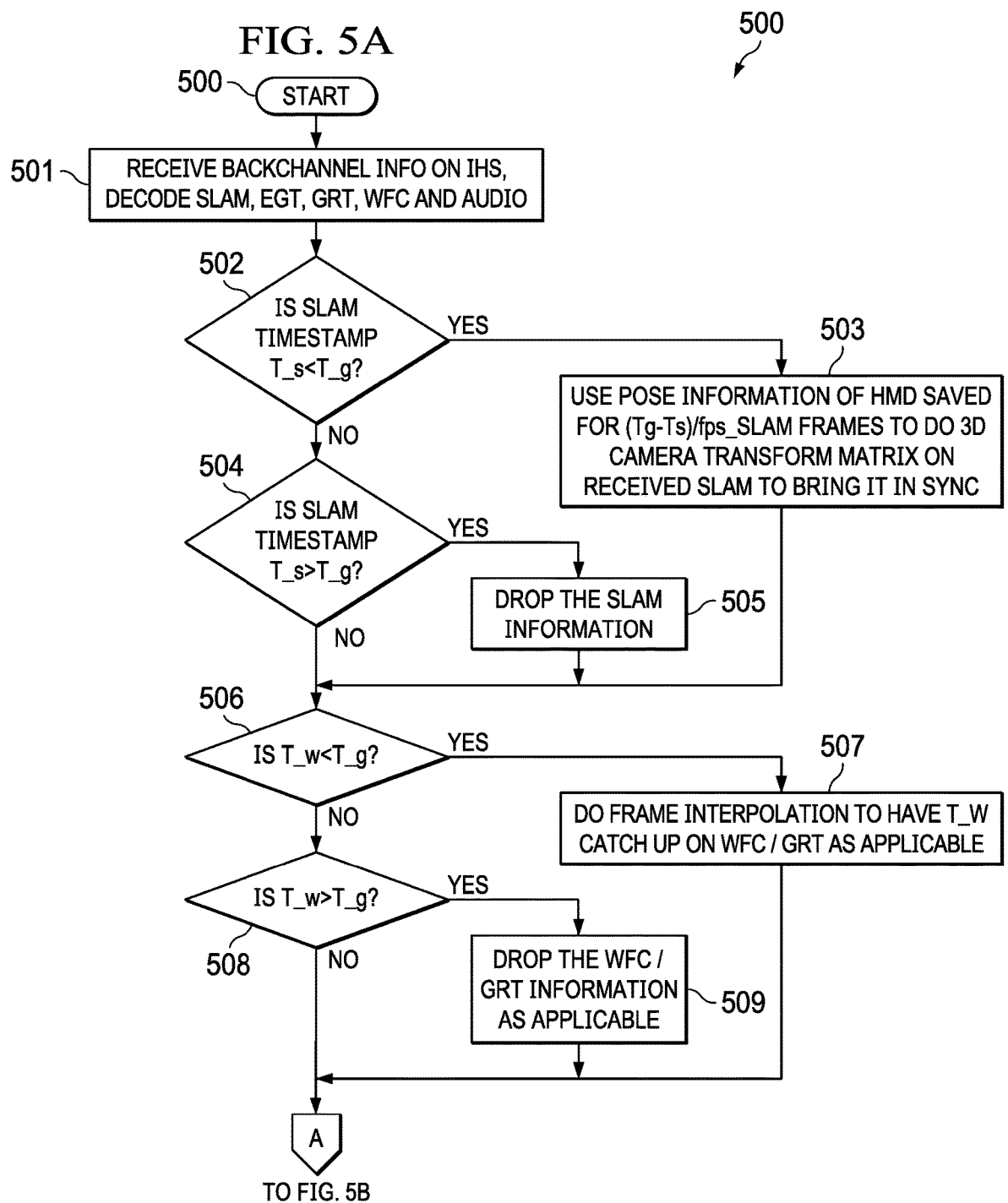
FIGS. 5A and 5B illustrate an example of a method for adaptive backchannel synchronization for xR applications in edge cloud architectures, according to some embodiments.
Figure 5B:
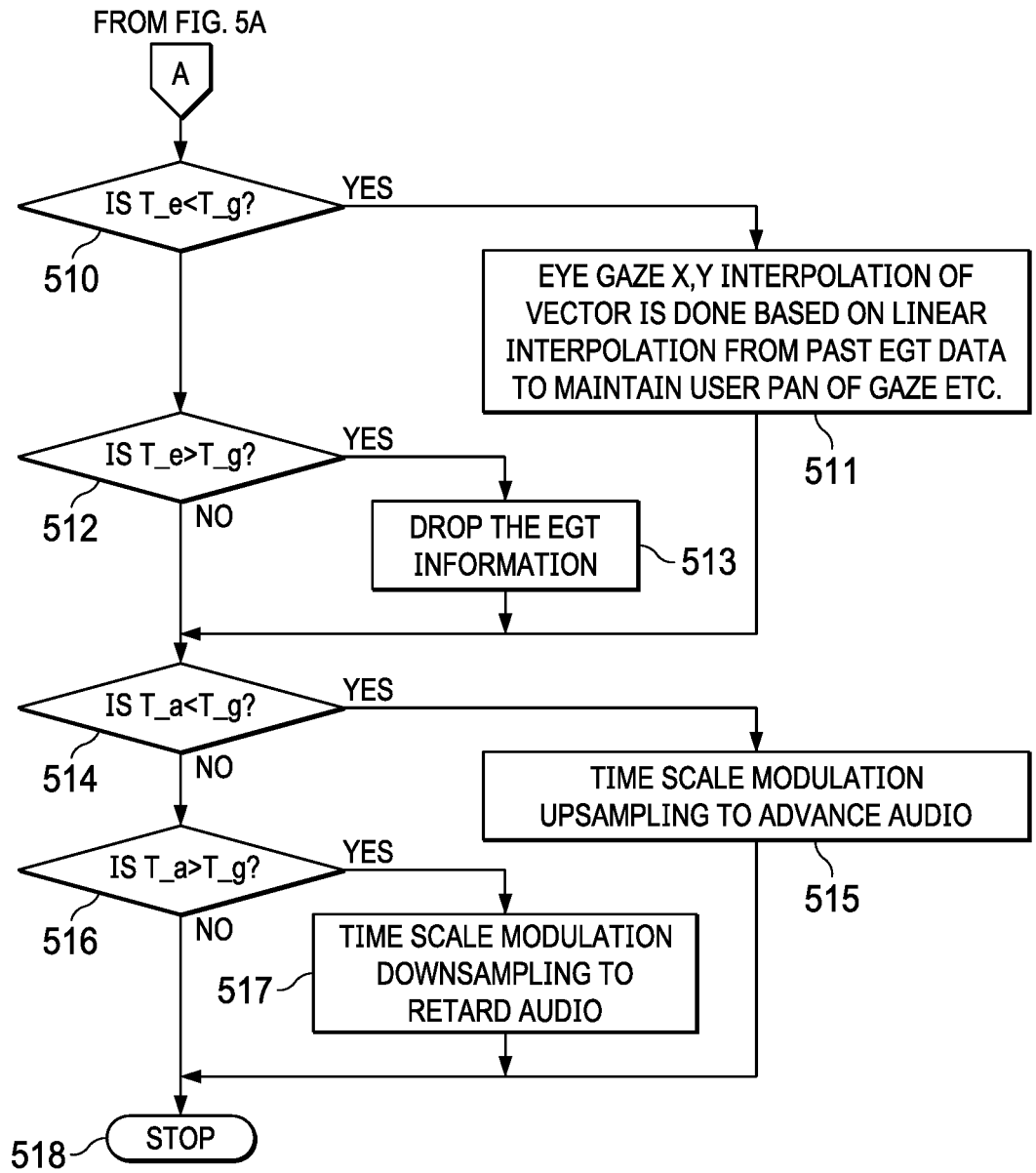

FIGS. 5A and 5B illustrate an example of method 500 for adaptive backchannel synchronization in edge cloud architectures. In some embodiments, method 500 may be performed by xR application 401 in cooperation with distributed SLAM module 403, under execution by an instance of IHS 103 coupled to HMD 102. Method 500 begins at block 500.

At block 501, method 500 includes receiving from HMD 102, a SLAM data stream, an EGT data stream, a GRT data stream, a WFC data stream, and an audio data stream. Each data stream may include a plurality of packets (e.g., Real-time Transport Protocol (RTP) or the like). Each packet may include a timestamp in its header section, and each timestamp may be indicative of the time of capture of data contained in the payload of that packet and/or the order of packets in the data stream. Moreover, in the case of SLAM packets, the payload of each packet may include one or more SLAM landmark(s) along with respective HMD pose information (e.g., from an IMU).

At block 502, method 500 may examine, for a current packet in the SLAM data stream, whether the timestamp of that packet $T\_s$ is smaller than a global timestamp $T\_g$ by at least a threshold value, which indicates that the SLAM data stream is lagged with respect to a time reference. In some cases, in order for IHS 103 to create such a time reference, HMD 102 may transmit an indication of a SLAM frame rate and a seed value usable by IHS 103 to generate a counter.

If block 502 determines that $T\_s<T\_g$ by at least a threshold time value, then block 503 transforms lagged SLAM data into current SLAM data. For example, in block 503, IHS 103 may use pose information obtained from an earlier SLAM packet or saved for $(T\_g-T\_s)/SLAM\_fps$ frames to perform a 3D camera transform matrix on received SLAM to bring it in sync. Conversely, if block 504 determines that $T\_s>T\_g$ by at least the threshold time value, block 505 may drop the advanced SLAM packet(s).

In some cases, an IHS may select aforementioned the threshold time value as: a first value (e.g., in milliseconds) in response to the IHS being a co-located IHS 103, a second value greater than the first value in response to the IHS being an edge server 113, or a third value greater than the second value in response to the IHS being a cloud server 114.

Throughout execution of method 500, IHS 103 may receive and decode SLAM information from other IHS instances, for example, via IHS-to-IHS communications. As such, IHS 103 may collect and process ROIs/landmarks (e.g., coordinates, labels, etc.) from other client nodes that are not necessarily in direct communications with IHS 103. Each IHS may also transmit its HMD's relative pose to other IHSs coupled to other co-located HMDs. In these cases, in response to a determination that the received SLAM data is from another co-located HMD and/or IHS, IHS 103 may change a threshold time value to loosen or tighten the synchronization enforced as needed, to maintain a desired level of user experience.

At block 506, method 500 may examine, for a current packet in the WFC/GRT data stream(s), whether the timestamp of that packet $T\_w$ is smaller than $T\_g$ by at least the same, or a different threshold value, which indicates that the WFC/GRT data stream(s) is/are lagged. If so, block 507 transforms lagged WFC/GRT data into current WFC/GRT data. For example, in block 507, IHS 103 may perform frame interpolation to make the WFC/GRT streams catch up. Conversely, if block 508 determines that $T\_w>T\_g$ by at least the threshold value, then block 509 may drop the advanced WFC/GRT packet(s).

At block 510, method 500 may examine, for a current packet in the EGT data stream, whether the timestamp of that packet $T\_e$ is smaller than $T\_g$ by the same, or a different threshold value, which indicates that the EGT data stream is lagged. If so, then block 511 transforms lagged EGT data into current EGT data. For example, in block 511, IHS 103 may perform linear vector interpolation upon EGT data from earlier EGT packets to maintain the user's pan of gaze. Conversely, if block 512 determines that $T\_e>T\_g$ by at least the threshold value, then block 519 may drop the advanced EGT packet(s).

At block 516, method 500 may examine, for a current packet in an audio data stream, whether the timestamp of that packet $T\_a$ is smaller than $T\_g$ by the same, or a different threshold value, which indicates that the audio data stream is lagged. If so, then block 515 transforms lagged audio data into current audio data. For example, in block 515, IHS 103 may perform time scale modulation up-sampling to advance the audio. Conversely, if block 516 determines that $T\_a>T\_g$ by at least the threshold value, then block 519 may retard the audio using time-scale modulation down-sampling. Method 500 ends at block 518.

Figure 6:
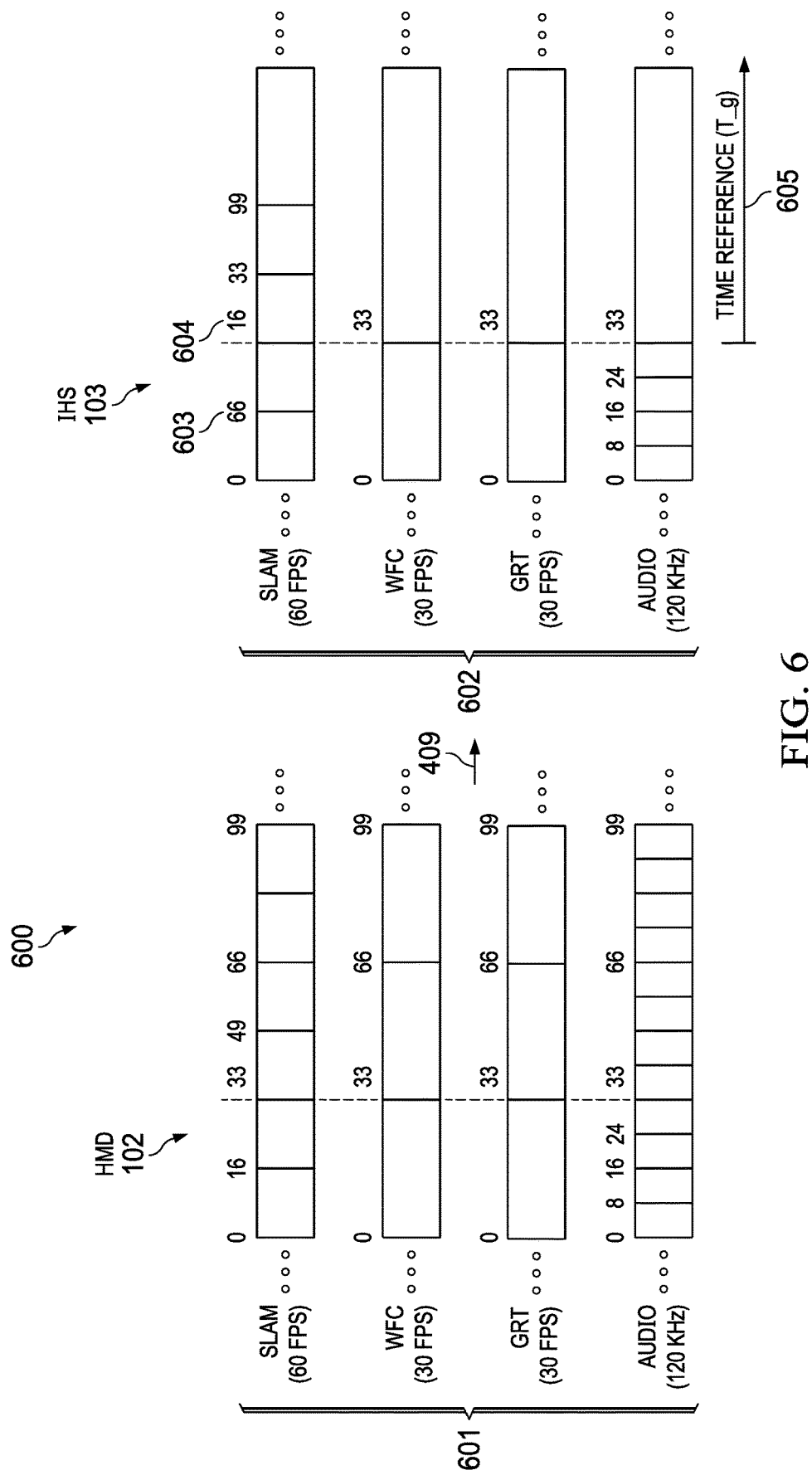
FIG. 6 illustrates an adaptive backchannel synchronization example, according to some embodiments.

To illustrate application of method 500, FIG. 6 shows an adaptive backchannel synchronization example 600. In this example, HMD 102 produces a number of data streams 601, including, but not limited to, a SLAM data stream (e.g., 60 fps), a WFC data stream (e.g., 30 fps), a GRT data stream (e.g., 30 fps), and an audio data stream (e.g., 120 kHz); and it transmits those data streams 601 to IHS 103 via backchannel 409.

When IHS 103 processes received data streams 602 using time reference 605 to produce global timestamp $T\_g$. In this example, all packets with the 33 ms timestamp in the WFC, GRT, and audio data streams are synchronized, but packets in the SLAM data stream are out of order. In this case, an advanced SLAM packet with a 66 ms timestamp 603 may be held for later use or dropped, and the data in the lagged SLAM packet with the 16 ms timestamp 604 may be transformed into current SLAM data by extrapolation, as described above.

As such, the various systems and methods herein are adaptive in nature, and can computationally scale to resolve synchronization issues with varying frequency leading to varying accuracy and latency. These systems and methods may be implemented on IHS 103, 113, and/or 114 as a software service, without the need for additional hardware. Moreover, no changes to the render engine (or data being sent from HMD 102) are required.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution, cause the IHS to:
receive, from a first Head-Mounted Device (HMD), first Simultaneous Localization and Mapping (SLAM) data comprising a plurality of first packets;
receive, from the first HMD, an indication of a synchronized time;
when one or more of the first packets are advanced with respect to the synchronized time by at least a threshold value, drop the one or more first packets, the threshold value indicating an amount of delay in which the first packets of the SLAM data are determined to be out of synchronization with respect to a second data stream; and
when the one or more first packets are lagged with respect to the synchronized time by at least the threshold value, transform the lagged one or more first packets into current SLAM data.

2. The IHS of claim 1, wherein the indication of the synchronized time comprises a SLAM frame rate and a seed value.

3. The IHS of claim 1, wherein each of the plurality of packets includes at least one SLAM landmark and a timestamp.

4. The IHS of claim 3, wherein each of the first plurality of packets further comprises pose information.

5. The IHS of claim 3, wherein to transform the lagged first packets into the current SLAM data, the program instructions, upon execution, further cause the IHS to apply a camera transform matrix to the lagged first packets using pose information obtained from an earlier SLAM packet.

6. The IHS of claim 1, wherein the program instructions, upon execution, further cause the IHS to select the threshold value as: a first value in response to the IHS being a co-located IHS, a second value greater than the first value in response to the IHS being an edge server, or a third value greater than the second value in response to the IHS being a cloud server.

7. The IHS of claim 1, wherein the threshold value is selected based upon a latency parameter associated with the IHS.

8. The IHS of claim 1, wherein the threshold value is selected based upon a speed of movement of the first HMD.

9. The IHS of claim 1, wherein the program instructions, upon execution, further cause the IHS to:
receive, from the first HMD, World-Facing Camera (WFC) or Gesture Recognition and Tracking (GRT) data comprising a plurality of second packets; and
when one or more of the second packets are advanced with respect to the synchronized time by at least the threshold value, drop one or more of the plurality second packets; and
when the one or more second packets are lagged with respect to the synchronized time by at least the threshold value, transform the one or more lagged second packets into current WFC or GRT data using temporal interpolation.

10. The IHS of claim 1, wherein the program instructions, upon execution, further cause the IHS to:
receive, from the first HMD, Eye-Gaze Tracking (EGT) data comprising a second plurality of packets; and
when one or more of the second packets are advanced with respect to the synchronized time by at least the threshold value, drop the one or more second packets; and
when the one or more second packets are lagged with respect to the synchronized time by at least the threshold value, transform the one or more second packets into current EGT data using linear interpolation.

11. The IHS of claim 1, wherein the program instructions, upon execution, further cause the IHS to:
receive, from the first HMD, audio data comprising a plurality of second packets; and
when one or more of the second packets are advanced with respect to the synchronized time by at least the threshold value, transform the one or more lagged second packets into current audio data using time scale modulation downsampling; and
when the one or more second packets are lagged with respect to the synchronized time by at least the threshold value, transform the one or more lagged second packets into current audio data using time scale modulation upsampling.

12. The IHS of claim 1, wherein the program instructions, upon execution, further cause the IHS to:
receive, from a second HMD co-located with the first HMD, second SLAM data comprising a second plurality of packets; and
when one or more of the second packets are advanced with respect to the synchronized time by at least a second threshold value, wherein the second threshold value is larger than the first threshold value, drop one or more of the second packets; and
when the one or more second packets are lagged with respect to the other synchronized time by at least the second threshold value, transform the one or more second packets into current SLAM data.

13. A hardware memory having program instructions stored thereon that, upon execution by an Information Handling System (IHS), cause the IHS to:
receive Simultaneous Localization and Mapping (SLAM) data comprising a plurality of first packets;

select a first threshold value that indicates an amount of delay in which the first packets of the SLAM data are determined to be out of synchronization with respect to a second data stream; and when one or more of the first packets are advanced by the selected threshold value or more, drop the one or more first packets; and when the one or more first packets are lagged by the selected threshold value or more, transform the one or more lagged first packets into current SLAM data.

14. The hardware memory of claim 13, wherein the program instructions, upon execution, further cause the IHS to:

receive World-Facing Camera (WFC) or Gesture Recognition and Tracking (GRT) data comprising a plurality of second packets; and when one or more of the first packets are advanced with respect to the synchronized time by the threshold value or more, drop the one or more second packets; and when the one or more second packets are lagged with respect to the synchronized time by the threshold value or more, transform the one or more lagged second packets into current WFC or GRT data.

15. The hardware memory of claim 13, wherein the program instructions, upon execution, further cause the IHS to:

receive Eye-Gaze Tracking (EGT) data comprising a plurality of second packets; and when one or more of the second packets are advanced with respect to the synchronized time by the threshold value or more, drop the one or more second packets; or when the one or more second packets are lagged with respect to the synchronized time by the threshold value or more, transform the one or more lagged second packets into current EGT data.

16. The hardware memory of claim 13, wherein the program instructions, upon execution, further cause the IHS to:

receive audio data; and when the audio data is advanced or lagged with respect to the synchronized time by the threshold value or more, transform the lagged audio data into current audio data.

17. A method, comprising:

receiving, by an Information Handling System (IHS) from a Head-Mounted Device (HMD), Simultaneous Localization and Mapping (SLAM) data comprising a plurality of first packets; and when one or more of the first packets are advanced by at least a first threshold value, dropping the one or more first packets, the first threshold value indicating an amount of delay in which the first packets of the SLAM data are determined to be out of synchronization with respect to a second data stream; and when the one or more first packets are lagged by at least the first threshold value, transforming the one or more lagged first packets into current SLAM data.

18. The method of claim 17, further comprising:

receiving, from the HMD, World-Facing Camera (WFC) or Gesture Recognition and Tracking (GRT) data comprising a plurality of second packets; and when one or more of the second packets are advanced by at a second threshold value, dropping the one or more second packets; or when the one or more second packets are lagged by at least the second threshold value, transforming the one or more lagged second packets into current WFC or GRT data.

19. The method of claim 18, further comprising:

receiving, from the HMD, Eye-Gaze Tracking (EGT) data comprising a plurality of third packets; and when one or more of the third packets are advanced by at least a third threshold value, dropping the one or more of third packets; and when the one or more third packets are lagged with respect to the synchronized time by at least the third threshold value, transforming the one or more lagged third packets into current EGT data.

20. The method of claim 19, further comprising:

receiving, from the HMD audio data comprising a plurality of fourth packets; and when one or more of the fourth packets are advanced or lagged with by at least a fourth threshold value, synchronizing the one or more fourth packets with the SLAM data.

* * * * *

UNITED STATES PATENT AND TRADEMARK OFFICE
CERTIFICATE OF CORRECTION

PATENT NO. : 11,159,645 B2  
APPLICATION NO. : 16/449258  
DATED : October 26, 2021  
INVENTOR(S) : Iyer et al.

Page 1 of 1

It is certified that error appears in the above-identified patent and that said Letters Patent is hereby corrected as shown below:

In the Claims

In Column 20, Line 38, Claim 11, delete "and" and INSERT:
-- and
at least one of: -- therefor.

Signed and Sealed this  
Twenty-third Day of November, 2021

Drew Hirshfeld  
*Performing the Functions and Duties of the*  
*Under Secretary of Commerce for Intellectual Property and*  
*Director of the United States Patent and Trademark Office*